US006240726B1

(12) United States Patent
Lin

(10) Patent No.: US 6,240,726 B1
(45) Date of Patent: Jun. 5, 2001

(54) HYDRAULIC JACK DEVICE

(75) Inventor: Lai-Shun Lin, Jia Yi Hsien (TW)

(73) Assignee: Kai Hsiang Enterprise Co., Ltd., Jia Yi Hsien (TW)

( * ) Notice: Subject to any disclaimer, the term of this patent is extended or adjusted under 35 U.S.C. 154(b) by 0 days.

(21) Appl. No.: 09/426,209

(22) Filed: Oct. 25, 1999

(51) Int. Cl.[7] ........................................ F16D 31/02
(52) U.S. Cl. ........................................ 60/479; 60/481
(58) Field of Search ........................ 60/479, 477, 482, 60/481

(56) References Cited

U.S. PATENT DOCUMENTS 5,755,099 * 5/1998 Hung ........................................ 60/479

* cited by examiner

*Primary Examiner*—Edward K. Look
*Assistant Examiner*—Michael Leslie
(74) *Attorney, Agent, or Firm*—Alan D. Kamrath; Rider, Bennett, Egan & Arundel, LLP

(57) ABSTRACT

A hydraulic jack device has a pump, a handle, a hydraulic cylinder, a rocking arm, and a lifting seat. A hydraulic shaft is inserted through the hydraulic cylinder and connected to the rocking arm. The rocking arm is connected to the lifting seat. The pump has a main body connected to the hydraulic cylinder, a chamber formed in the main body, a piston cylinder, a piston, and a C-shaped ring. The driven rod has a round end and a hollow box end. The driven rod passes through the piston cylinder, a coiled spring, and the piston. The round end of the driven rod is inserted in the chamber. A first and a second oil channels are formed in the hydraulic cylinder.

3 Claims, 6 Drawing Sheets

HYDRAULIC JACK DEVICE

BACKGROUND OF THE INVENTION

The present invention relates to a jack device. More particularly, the present invention relates to a hydraulic jack device which can be operated efficiently.

A conventional hydraulic jack cannot be lifted very fast. The user should operate the conventional hydraulic jack for about forty strokes of a pump before the conventional hydraulic jack reaches a lifted article.

SUMMARY OF THE INVENTION

An object of the present invention is to provide a hydraulic jack device which can be operated efficiently.

Accordingly, a hydraulic jack device comprises a pump, a handle, a hydraulic cylinder, a rocking arm, and a lifting seat. A hydraulic shaft is inserted through the hydraulic cylinder and connected to the rocking arm. The rocking arm is connected to the lifting seat. The pump has a main body connected to the hydraulic cylinder, a chamber formed in the main body, a protruded block disposed on the main body, a piston cylinder disposed on a top portion of the main body, a piston disposed between the main body and the piston cylinder, and a C-shaped ring disposed on a top portion of the chamber to fasten a driven rod. The driven rod has a round end and a hollow box end. The piston cylinder has a hexagonal hole receiving a coiled spring. The piston has a round hole. The driven rod passes through the hexagonal hole of the piston cylinder, the coiled spring, and the round hole of the piston. The round end of the driven rod is inserted in the chamber. A first oil channel is formed in the hydraulic cylinder to communicate with the chamber. A second oil channel is formed in the hydraulic cylinder to communicate with the piston cylinder. The handle has a connection end engaging with the protruded block.

DETAILED DESCRIPTION OF THE INVENTION

Figure 1:
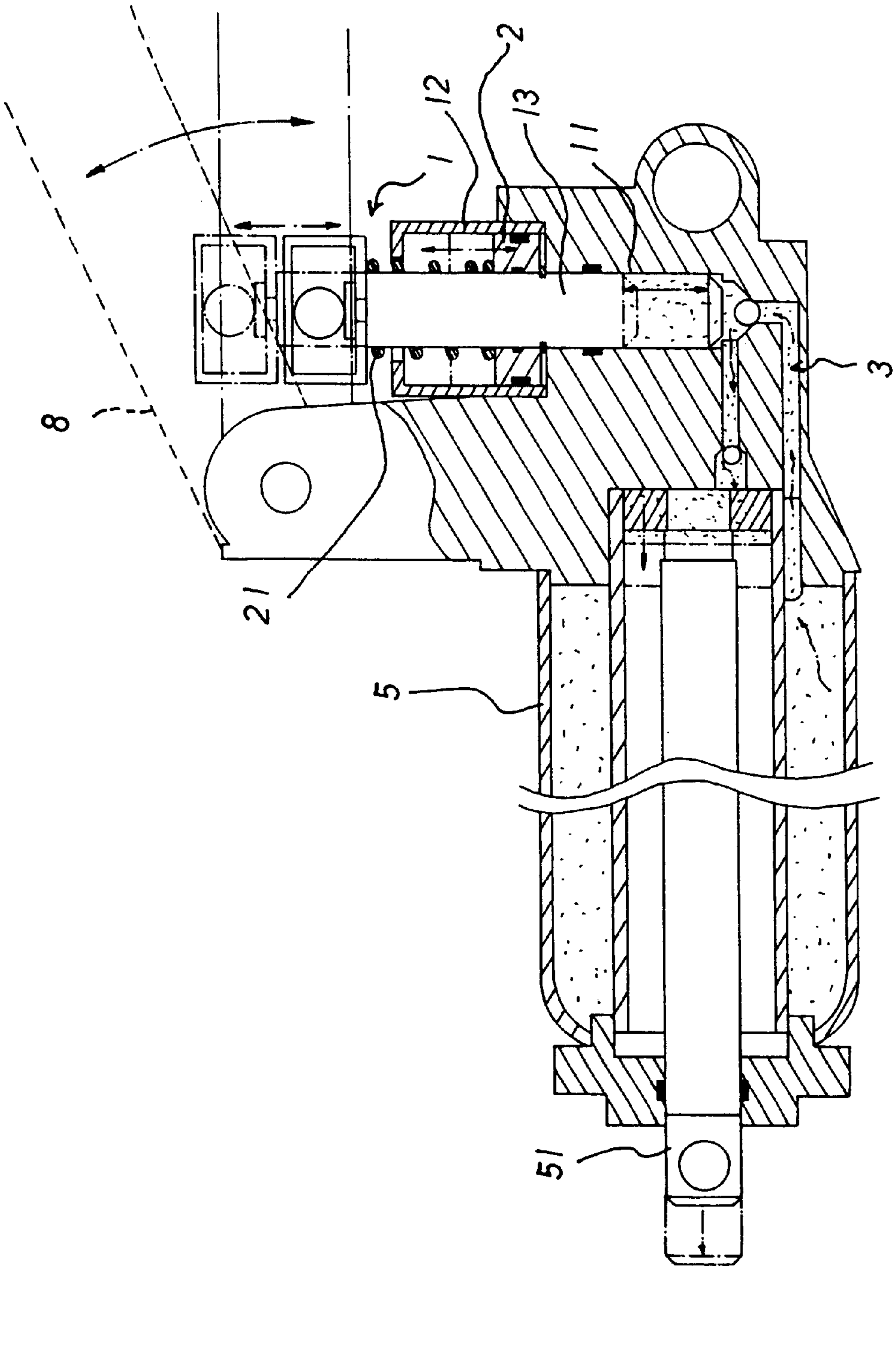
FIG. 1 is a sectional assembly view of a hydraulic jack device of a preferred embodiment without a rocking arm and a lifting seat.
Figure 2:
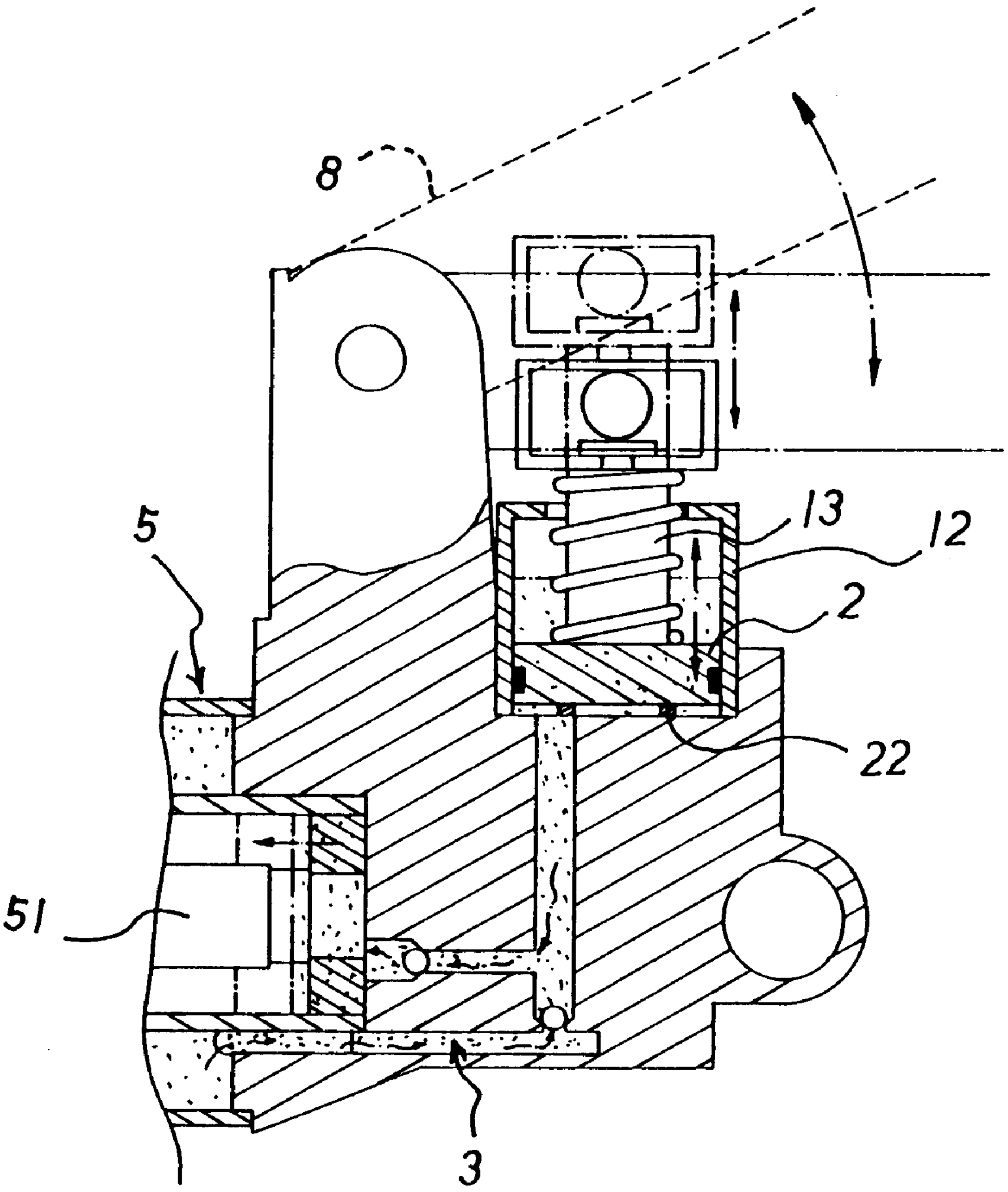
FIG. 2 is a partially sectional assembly view of a hydraulic jack device of a preferred embodiment without a rocking arm and a lifting seat.
Figure 3:
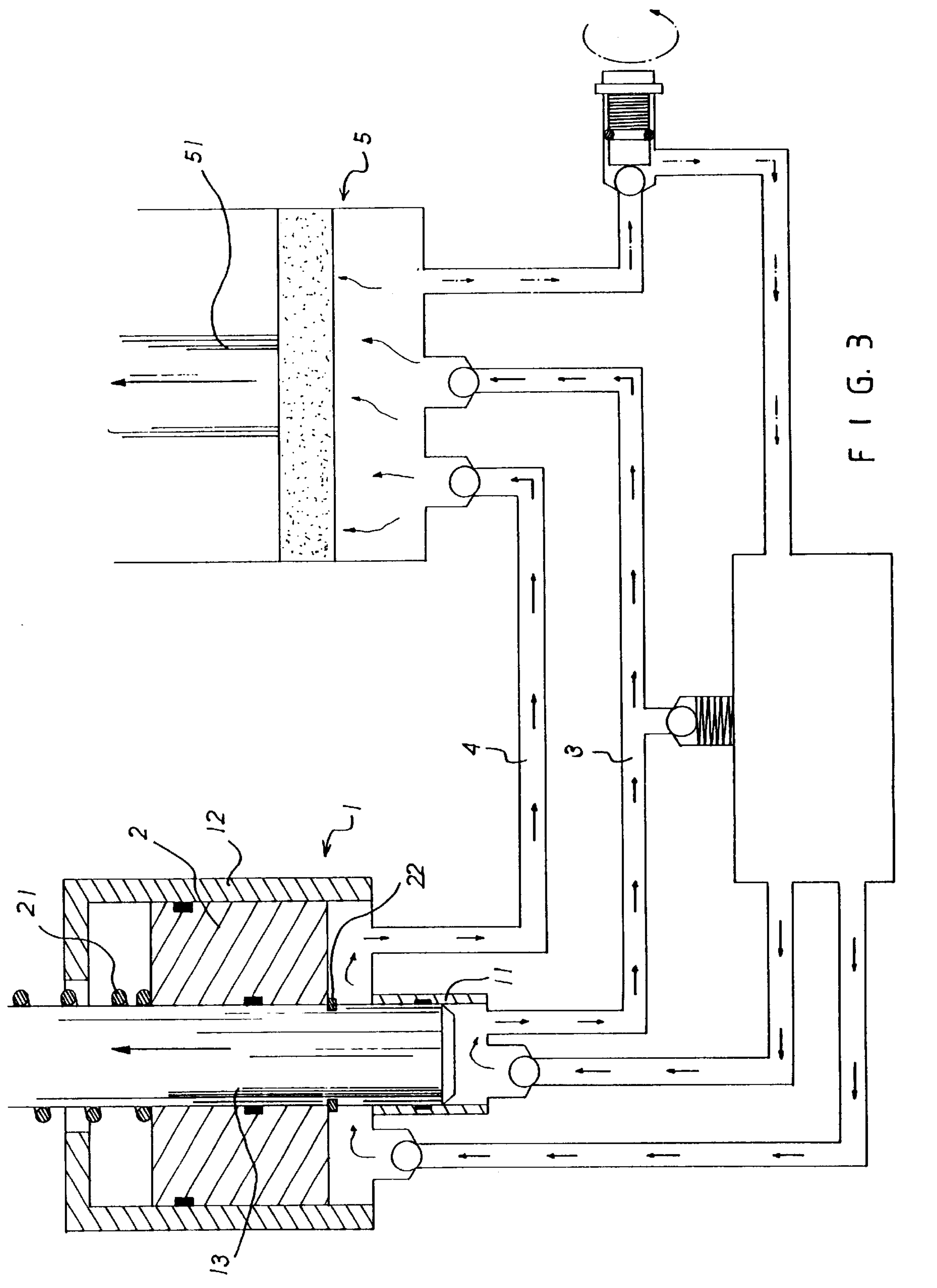
FIG. 3 is a schematic view illustrating a flowing direction of oil of a hydraulic jack device of a preferred embodiment in accordance with the present invention.
Figure 4:
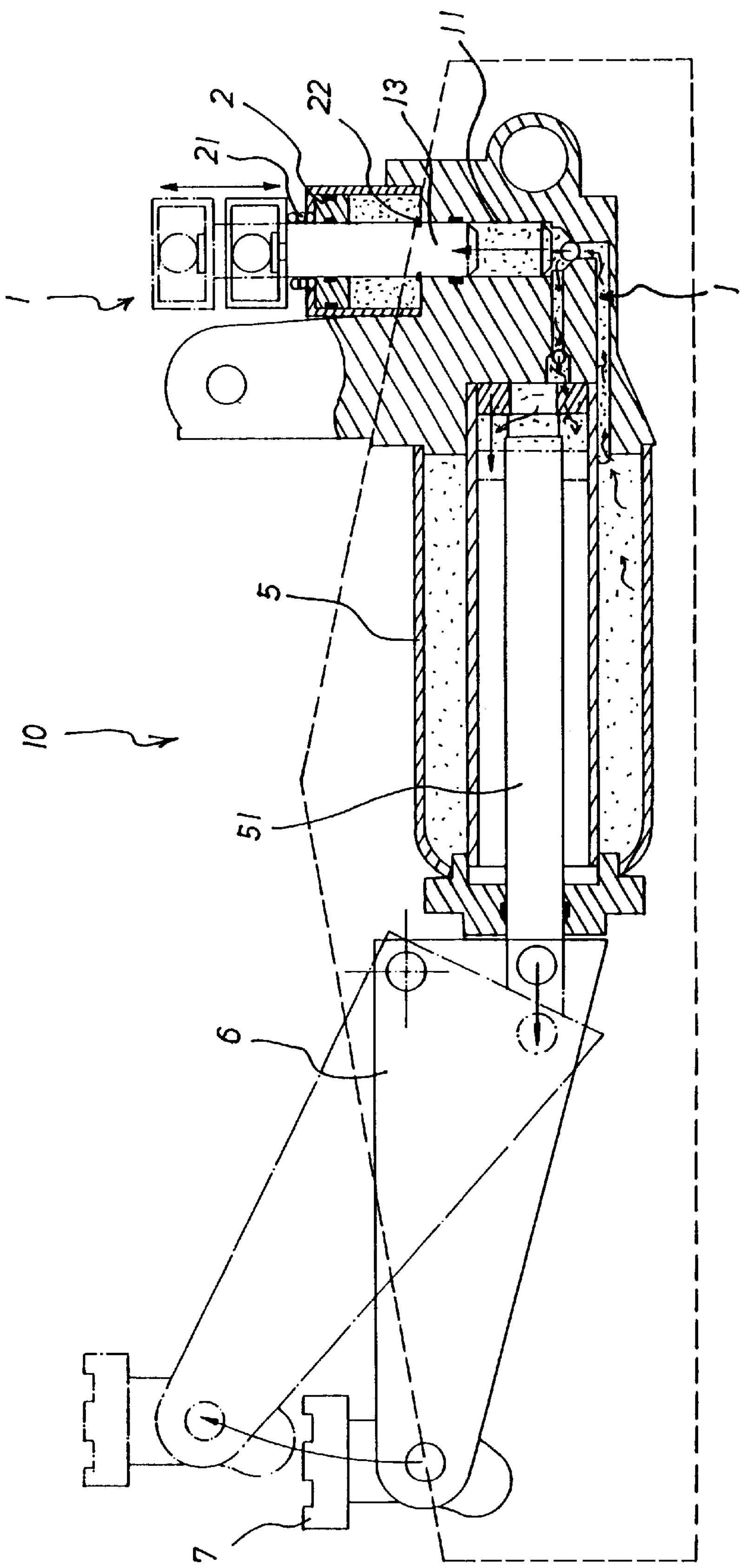
FIG. 4 is a schematic view illustrating an operation of a hydraulic jack device of a preferred embodiment in accordance with the present invention.

Referring to FIGS. 1 to 6, a hydraulic jack device 10 comprises a pump 1, a handle 8, a hydraulic cylinder 5, a rocking arm 6, and a lifting seat 7.

A hydraulic shaft 51 is inserted through the hydraulic cylinder 5 and connected to the rocking arm 6. The rocking arm 6 is connected to the lifting seat 7.

The pump 1 has a main body 100 connected to the hydraulic cylinder 5, a chamber 11 formed in the main body 100, a protruded block 50 disposed on the main body 100, a piston cylinder 12 disposed on a top portion of the main body 100, a piston 2 disposed between the main body 100 and the piston cylinder 12, and a C-shaped ring 22 disposed on a top portion of the chamber 11 to fasten a driven rod 13. The driven rod 13 has a round end 132 and a hollow box end 131.

The piston cylinder 12 has a hexagonal hole 121 receiving a coiled spring 21. The piston 2 has a round hole 20.

The driven rod 13 passes through the hexagonal hole 121 of the piston cylinder 12, the coiled spring 21, and the round hole 20 of the piston 2.

The round end 132 of the driven rod 13 is inserted in the chamber 11.

A first oil channel 3 is formed in the hydraulic cylinder 5 to communicate with the chamber 11.

A second oil channel 4 is formed in the hydraulic cylinder 5 to communicate with the piston cylinder 12.

The handle 8 has a connection end 81 engaging with the protruded block 50.

The protruded block 50 has a circular hole 501.

The connection end 81 of the handle 8 has a first through hole 82 and a second through hole 83. A first pin 91 fastens the protruded block 50 and the connection end 81 of the handle 8 together via the first through hole 82 of the connection end 81 and the circular hole 501 of the protruded block 50. A second pin 92 fastens the hollow box end 131 of the driven rod 13 and the connection end 81 of the handle 8 together via the second through hole 83 of the connection end 81 of the handle 8.

A one-way valve is disposed in the first oil channel 3. Another one-way valve is disposed in the second oil channel 4.

When the driven rod 13 is driven upward, the hydraulic oil will flow from the first oil channel 3 to the chamber 11. Then the hydraulic oil will flow from the second oil channel 4 to the piston cylinder 12.

When the driven rod 13 is driven downward, the hydraulic oil will flow from the chamber 11 to the hydraulic cylinder 5. Then the hydraulic oil will flow from the piston cylinder 12 to the hydraulic cylinder 5.

Figure 5:
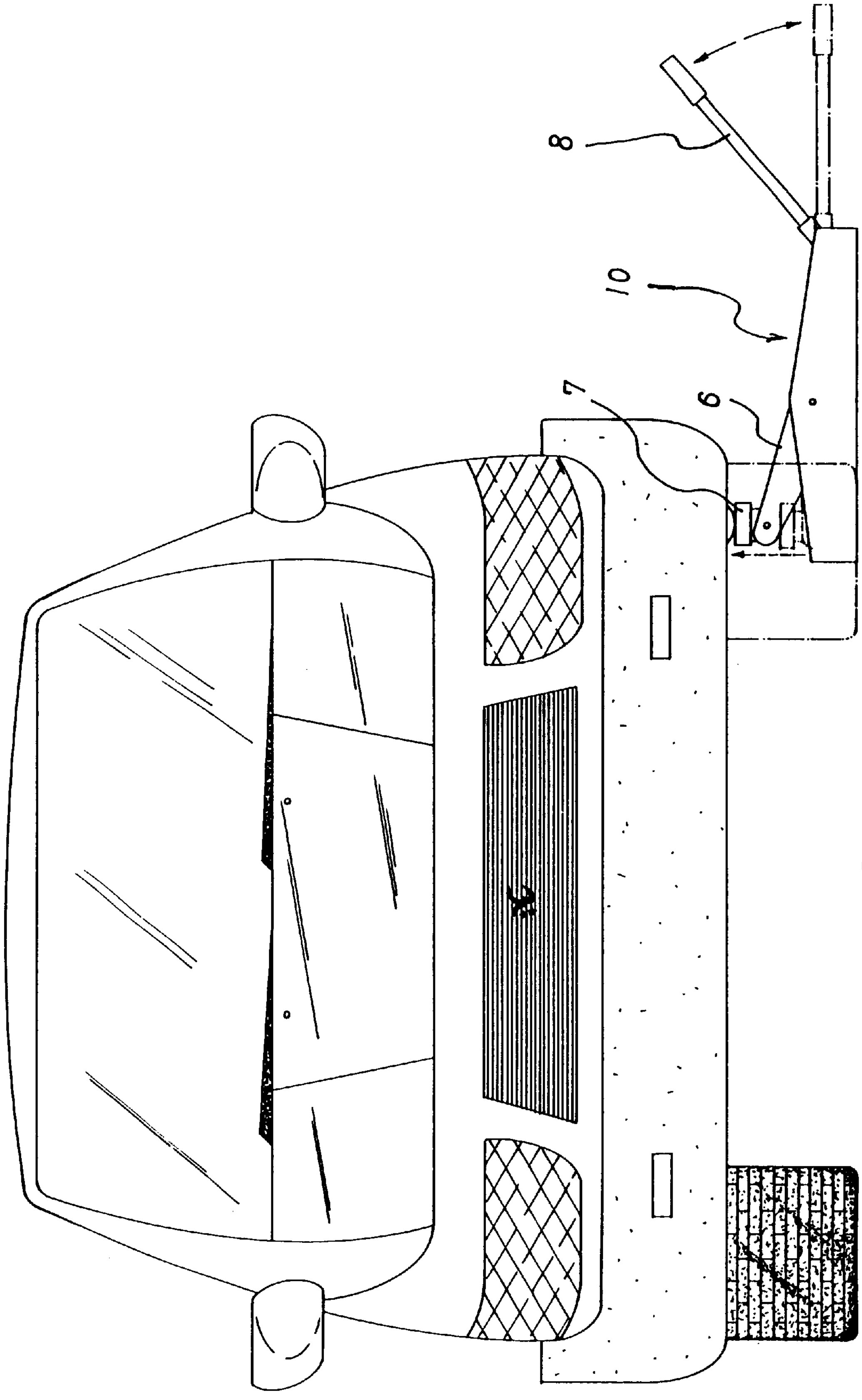
FIG. 5 is a schematic view illustrating an application of a hydraulic jack device of a preferred embodiment in accordance with the present invention.
Figure 6:
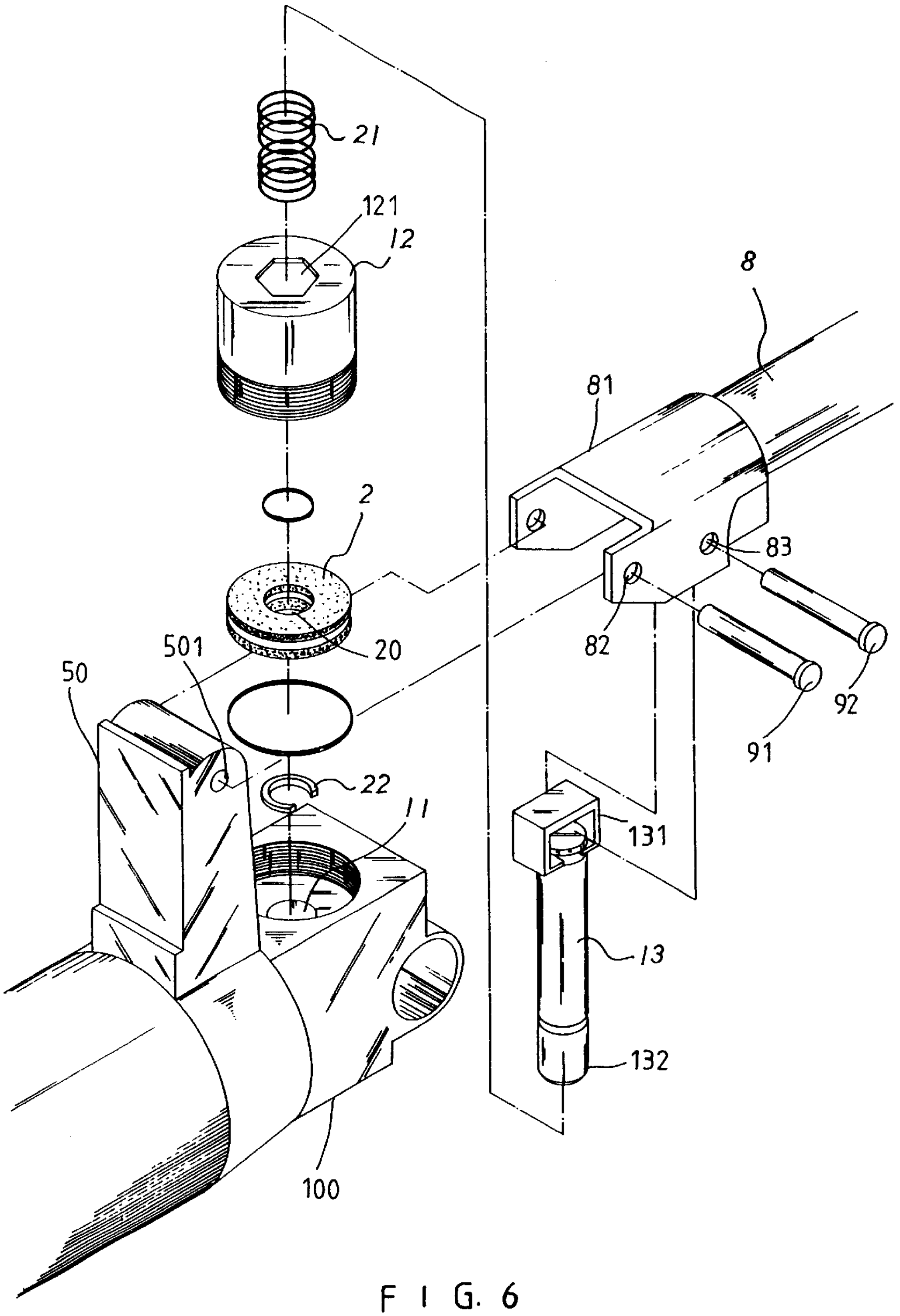
FIG. 6 is a partially perspective view of a hydraulic jack device of a preferred embodiment in accordance with the present invention.

Referring to FIG. 5, the hydraulic jack device 10 lifts a car.

The invention is not limited to the above embodiment but various modification thereof may be made. Further, various changes in form and detail may be made without departing from the scope of the invention.

I claim:

1. A hydraulic jack device comprises:

a pump, a handle, a hydraulic cylinder, a rocking arm, and a lifting seat, a hydraulic shaft inserted through the hydraulic cylinder and connected to the rocking arm, the rocking arm connected to the lifting seat, the pump having a main body connected to the hydraulic cylinder, a chamber formed in the main body, a protruded block disposed on the main body, a piston cylinder disposed on a top portion of the main body, a piston disposed between the main body and the piston cylinder, and a C-shaped ring disposed on a top portion of the chamber to fasten a driven rod, the driven rod having a round end and a hollow box end, the piston cylinder having a hexagonal hole receiving a coiled spring, the piston having a round hole, the driven rod passing through the hexagonal hole of the piston cylinder, the coiled spring, and the round hole of the piston, the round end of the driven rod inserted in the chamber, a first oil channel formed in the hydraulic cylinder to communicate with the chamber, a second oil channel formed in the hydraulic cylinder to communicate with the piston cylinder, and the handle having a connection end engaging with the protruded block.

2. The hydraulic jack device as claimed in claim 1, wherein the protruded block has a circular hole.

3. The hydraulic jack device as claimed in claim 2, wherein the connection end of the handle has a first through hole and a second through hole, a first pin fastens the protruded block and the connection end of the handle together via the first through hole of the connection end and the circular hole of the protruded block, and a second pin fastens the hollow box end of the driven rod and the connection end of the handle together via the second through hole of the connection end of the handle.

* * * * *